United States Patent [19]

Carkhuff

[11] Patent Number: 4,716,269

[45] Date of Patent: Dec. 29, 1987

[54] PLASMA ARC TORCH HAVING SUPPLEMENTAL ELECTRODE COOLING MECHANISMS

[75] Inventor: Donald W. Carkhuff, Florence, S.C.

[73] Assignee: L-TEC Company, Florence, S.C.

[21] Appl. No.: 913,989

[22] Filed: Oct. 1, 1986

[51] Int. Cl.[4] .................................................. B23K 9/00
[52] U.S. Cl. ..................... 219/121 PQ; 219/121 PM; 219/121 PP; 219/121 PN
[58] Field of Search ....... 219/121 P, 121 PQ, 121 PP, 219/121 PN, 121 PM, 74, 75; 313/231.31, 231.41, 231.51

[56] References Cited

U.S. PATENT DOCUMENTS

| 2,527,235 | 10/1950 | Tuthill et al. | 219/75 |
| 2,554,236 | 5/1951 | Bernard | 219/75 |
| 2,587,331 | 2/1952 | Jordan | 219/75 |
| 3,690,567 | 9/1972 | Borneman | 219/121 PQ |
| 3,832,513 | 8/1974 | Klasson | 219/121 PQ |
| 4,127,760 | 11/1978 | Meyer et al. | 219/121 P |
| 4,146,654 | 3/1979 | Guyonnet | 219/121 P |
| 4,282,418 | 8/1981 | Wuestner | 219/121 PP |
| 4,389,559 | 6/1983 | Rotolico et al. | 219/121 PP |
| 4,423,304 | 12/1983 | Bass et al. | 219/121 PM |
| 4,455,470 | 6/1984 | Klein et al. | 219/121 PP |
| 4,463,245 | 7/1984 | McNeil | 219/121 PN |
| 4,482,246 | 11/1984 | Meyer et al. | 219/121 PM |
| 4,551,609 | 11/1985 | Falk | 219/121 PR |
| 4,558,201 | 12/1985 | Hatch | 219/121 PQ |
| 4,580,032 | 4/1986 | Carkhuff | 219/121 PN |
| 4,581,516 | 4/1986 | Hatch et al. | 219/121 PQ |
| 4,625,094 | 11/1986 | Marhic et al. | 219/121 PN |

FOREIGN PATENT DOCUMENTS

| 0008701 | 3/1980 | European Pat. Off. . | |
| 0105840 | 8/1982 | Japan | 219/121 P |
| 0558617 | 1/1975 | U.S.S.R. . | |

*Primary Examiner*—M. H. Paschall
*Attorney, Agent, or Firm*—Bell, Seltzer, Park & Gibson

[57] ABSTRACT

Supplemental electrode cooling mechanisms are provided for a plasma arc torch, which mechanisms form a part of the gas flow mechanisms through the torch head for circulating the flowing gas through the current transfer assembly of the torch in direct contact with a maximum portion of the entire longitudinal extent of the surface of the upper portion of an electrode received within the current transfer assembly for additional cooling of the electrode to increase the life thereof, while maintaining desired seating of the electrode in the current transfer assembly and transfer of current to the electrode from the current transfer assembly.

6 Claims, 10 Drawing Figures

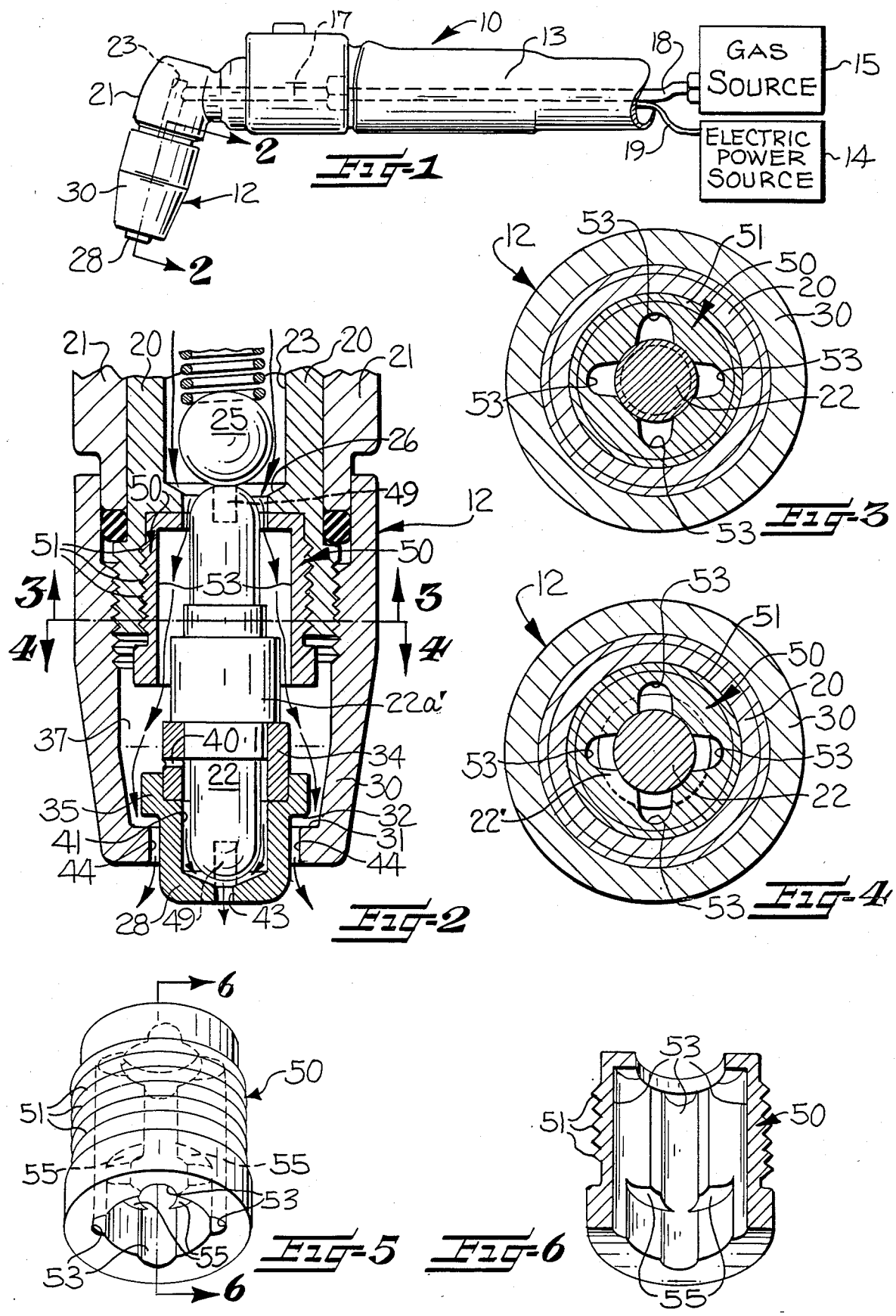

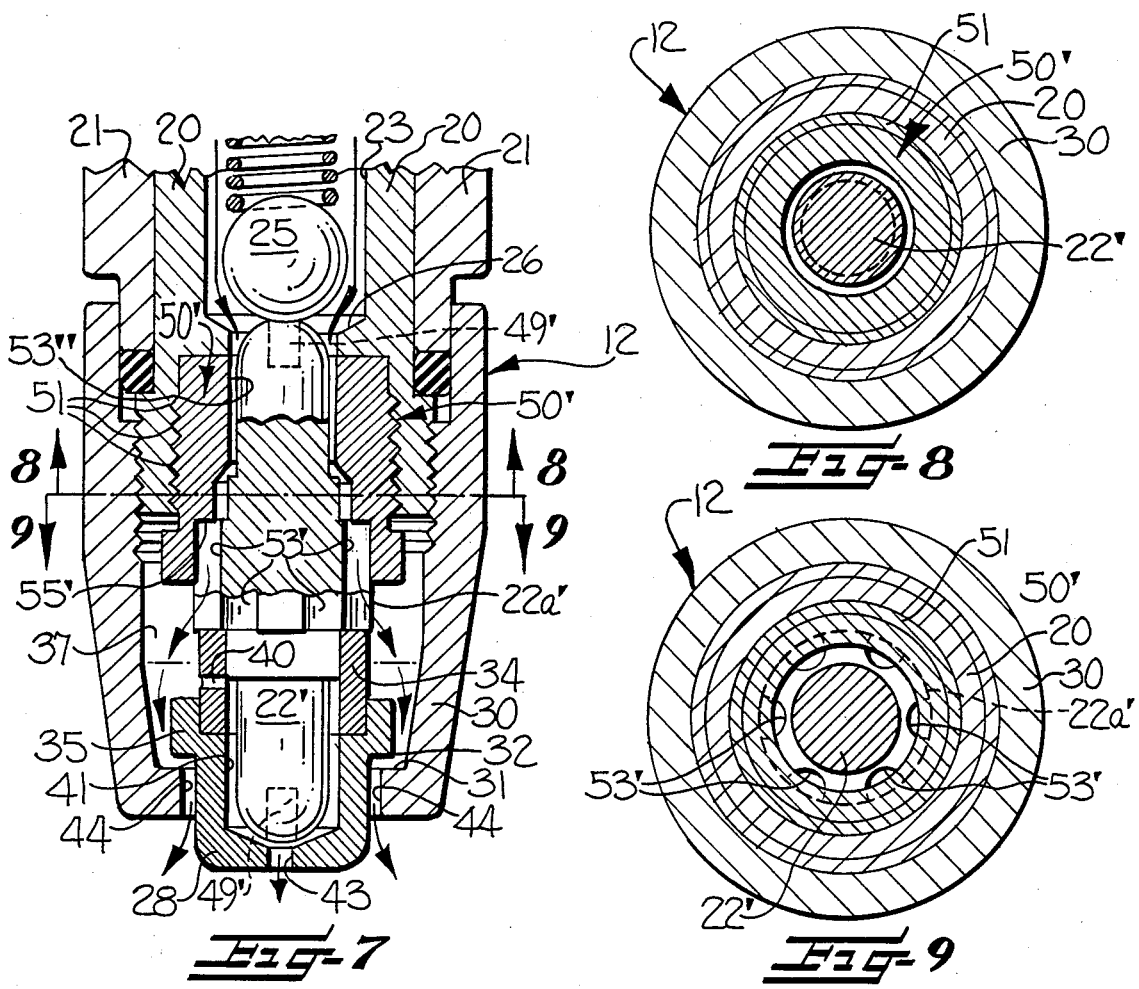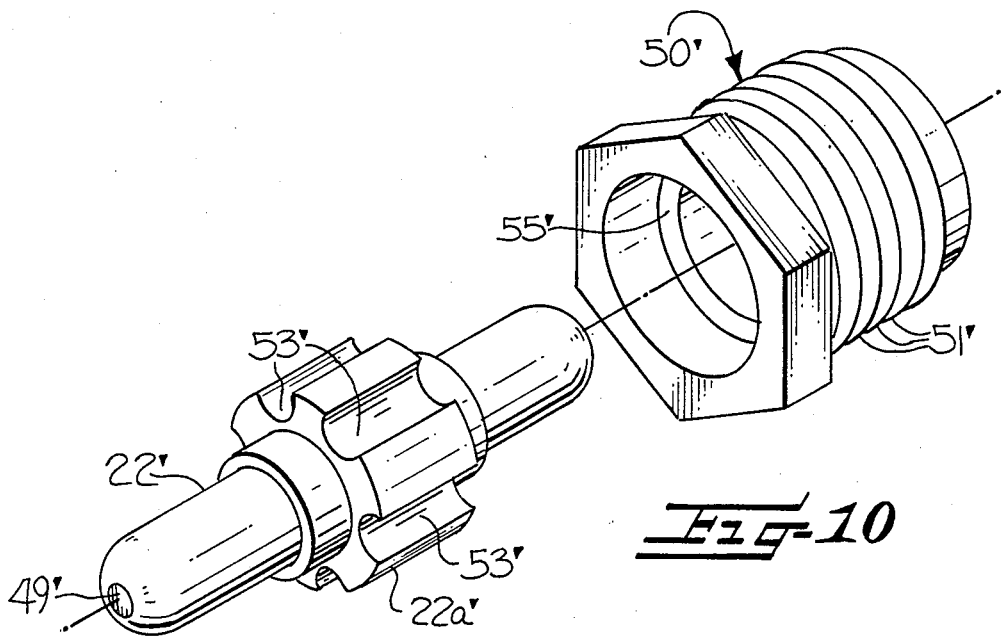

PLASMA ARC TORCH HAVING SUPPLEMENTAL ELECTRODE COOLING MECHANISMS

FIELD OF THE INVENTION

This invention relates to a plasma arc cutting or welding torch having supplemental mechanisms therein for cooling the electrode and thus extending the life of the electrode and emissive insert therein.

BACKGROUND OF THE INVENTION

Plasma arc torches have heretofore been commercially provided for cutting or welding and conventionally include a torch handle, a torch head attached thereto, a generally elongate electrode insertable in the torch head, current supply means adapted to be connected to a main power supply for supplying an electrical current through the torch handle to the torch head, gas flow means adapted to be connected to a source of gas for supplying a flow of the gas through the torch head for the plasma arc created by the torch and in contact with a lower portion of the electrode for partial cooling of the electrode, a current transfer assembly in the torch head for receiving and seating therewithin at least an upper portion of the electrode against upward movement in the torch head and operatively connected to the current supply means for transferring current to the electrode, a nozzle assembly for receiving and seating the lower portion of the electrode against downward movement in the torch head and operatively connected with the gas flow means for issuing a plasma arc outwardly from the torch head. The plasma arc is developed by passing the arc and gas through an arc constricting passageway formed in the nozzle located between the electrode and the work being cut or welded. This plasma arc cutting or welding process is well known to those with ordinary skill in the art and does not require further explanation herein for an understanding of the present invention. An example of this type of plasma arc cutting or welding torch, with safety control means, is disclosed in U.S. Pat. No. 4,580,032, issued Apr. 1, 1986, and assigned to the assignee of the present application.

This type of plasma arc torch, as may be seen in this prior U.S. Pat. No. 4,580,032, utilizes passageways through the torch head for the flow of gas for the plasma arc and for partial electrode cooling. These passageways are conveniently formed, in part, in the current transfer assembly, but do not pass in contact with the upper portion electrode being seated in the current transfer assembly so as not to interfere with seating of the upper part of the electrode in the current transfer assembly and contact thereof with the electrode for transferring current to the electrode.

Due to the extremely high temperatures caused by the plasma arc, the life of the electrodes is very short and the electrodes must be frequently replaced. Even though the plasma arc torch, as disclosed in prior U.S. Pat. No. 4,580,032, utilizes a reversible construction for the electrode in which the electrode can be removed and reversed and partial cooling for increasing the life of the electrode, the problem of frequency of replacement of the electrode still exists.

OBJECT AND SUMMARY OF THE INVENTION

Accordingly, it is the object of this invention to provide a supplemental electrode cooling means for the above described type of plasma arc torch to overcome the above discussed problems and to increase the life of the electrode in such torch.

By this invention, it has been found that this object may be accomplished by providing a supplemental electrode cooling means, in the above described type of plasma arc torch, which defines passageways forming a part of the gas flow means for circulating the flowing gas through the current transfer assembly in direct contact with a significant portion of the entire longitudinal extent of the surface of the upper portion of the electrode received within the current transfer assembly for additional cooling of the electrode to increase the life thereof, while maintaining desired seating of the electrode in the current transfer assembly against upward movement in the torch head and to maintain the transfer of current to the electrode from the current transfer assembly.

This supplemental electrode cooling means in a first preferred form comprises a hollow member insertable in the current transfer assembly and being formed of electrically conductived material for transferring current from said current transfer means to said electrode and defining therewithin the passageways which extend longitudinally of the electrode along the entire longitudinal extent of the upper portion of the electrode within the current transfer assembly for receiving the flowing gas therein for circulation over the surface of the electrode. The hollow member further defines therewithin shoulder portions protruding transversely inwardly toward the electrode between the passageways for providing an electrode seating means against upward movement of the electrode in the hollow member and the torch head. The hollow member is preferably threadably coupled in the current transfer assembly for ease of replacement.

In a second preferred form of the supplemental electrode cooling means, the gas flow passageways thereof are formed, at least in part, in the electrode. This second preferred form of the supplemental cooling means, preferably, further includes a hollow member insertable in the current transfer assembly, formed of electrically conductive material for transferring current from the current transfer assembly means to the electrode, and spaced on the inside surface thereof from the top part of the upper portion of the electrode within the current transfer assembly means to provide a passageway forming a part of the passageways of the supplemental electrode cooling means. The passageways in the electrode are formed through a lower part of the upper portion of the electrode for cooperating with the passageway between the hollow member and the electrode to receive the flowing gas for circulation over the surface of the electrode. The hollow member of this second form of supplemental electrode cooling means also defines therewithin shoulder portions protruding transversely inwardly toward the electrode between the passageways in the electrode for providing electrode seating means against upward movement of the electrode in the hollow member and the torch head. The hollow member is also preferably threadably coupled in the current transfer assembly for ease of replacement.

With the use of the supplemental cooling means of this invention in this type of plasma arc torch operating at a current of 30 amps and gas flow of approximately 250 cfh, it has been found that the life of the electrode is increased by at least approximately 200%.

BRIEF DESCRIPTION OF THE DRAWINGS

While some of the objects and advantages of this invention have been set forth above, other objects and advantages will appear as the description proceeds in conjuction with the attached drawings, in which:

FIG. 1 is a somewhat diagrammatic, side elevational view of a plasma arc torch having the supplemental electrode cooling means in accordance with this invention;

FIG. 2 is a partial sectional view through the torch head of the plasma arc torch of FIG. 1 and taken generally along the line 2—2 of FIG. 1 and illustrating a first preferred form of the supplemental electrode cooling means;

FIG. 3 is a sectional view taken generally along the line 3—3 of FIG. 2;

FIG. 4 is a sectional view taken generally along the line 4—4 of FIG. 2;

FIG. 5 is a perspective view of a hollow member utilized in the first preferred form of the supplemental electrode cooling means of FIGS. 2-4;

FIG. 6 is sectional view taken generally along the line 6—6 of FIG. 5;

FIG. 7 is a partial sectional view through the torch head of the plasma arc torch, like FIG. 2 but illustrating a second preferred form of the supplemental electrode cooling means;

FIG. 8 is a sectional view taken generally along the line 8—8 of FIG. 7;

FIG. 9 is a sectional view taken generally along the line 9—9 of FIG. 7; and

FIG. 10 is a perspective, exploded view of a hollow member and electrode utilized in the second preferred form of the supplemental electrode cooling means illustrated in FIGS. 7-9.

DETAILED DESCRIPTION OF PREFERRED EMBODIMENT

Referring now to the drawings, FIG. 1 illustrates somewhat diagrammatically a plasma arc torch, generally indicated at 10, for cutting or welding and having the supplemental electrode cooling means in accordance with this invention. This plasma arc torch 10 includes a torch head 12 and a torch handle 13, with the handle 13 supporting the head 12 at a fixed angle. Alternatively, the head 12 may extend from the handle 13 in a coaxial arrangement to form a pencil-like configuration (not shown). FIGS. 2-6 illustrate a first form of supplemental electrode cooling means in accordance with this invention and FIGS. 7-10 illustrate a second form of supplemental electrode cooling means in accordance with this invention.

The plasma arc torch 10 includes current supply means adapted to be connected to a main power supply 14 for supplying electric current to the torch head 12 and gas flow means adapted to be connected to a source of gas 15 for supplying gas to the torch head 12. As illustrated somewhat diagrammatically in FIG. 1, these means may comprise a tubular shank 17 extending from the handle 13 into the head 12 and being coupled with a gas conduit 18 from the gas source 15 and a suitable electrical conduit 19 from the main power supply 14. The tubular shank 17 may be a hollow copper tube or other electrically conductive material so as to pass an electric current to the head 12 and provide for the flow of gas therethrough to the head 12. Any suitable gas, such as compressed air, may be used.

The plasma arc torch 10 further includes a current transfer assembly 20 for receiving and seating therewithin at least an upper portion of an electrode 22 against upward movement in the torch head 12 and operatively connected to the current supply means for transferring current to the electrode 22. The current transfer assembly 20 may include upper and lower members threadably coupled together (not shown), as more fully described in U.S. Pat. No. 4,580,032, and constructed of conductive material, such as brass or the like. The current transfer assembly 20 is housed within a molded body portion 21. The tubular shank 17, comprising a portion of the current supply means and the gas supply means, is brazed or otherwise connected to the current transfer assembly for the transfer of current thereto and communicates with a bore 23 in the current transfer assembly 20 for providing a passageway for the flow of gas through the current transfer assembly 20.

In accordance with the improvements of prior U.S. Pat. No. 4,580,032, a safety ball valve assembly including a ball 25 and seat 26 is provided in the bore or passageway 23 to shut-off the flow of gas when replacing the electrode 22 in the torch 10, as fully explained in the aforementioned patent. As shown in this prior patent, the air flow passageway through the current transfer assembly 20 extends beyond the seat 26 of the ball valve assembly 25, 26 through the remainder of the current transfer assembly, but is so arranged that the air does not flow in contact with the surface of the electrode.

The plasma arc torch 10 further includes a nozzle assembly for receiving and seating a lower portion of the electrode 22 against downward movement in the torch head and is operatively connected with the gas flow means for issuing a plasma arc outwardly from the torch head 12. This nozzle assembly includes a nozzle member 28 carried by a heat shield 30 through cooperating collars 31, 32 on the heat shield 30 and nozzle member 28, respectively. The heat shield 30 is threadably coupled to the outside surface of the current transfer assembly 20 and overlaps the body portion 21, as shown in FIG. 2. The nozzle assembly may further include a ceramic swirl ring 34 carried by a further collar 35 on the nozzle member 28.

With the above arrangement, a gas passageway in the form of cavity 37 is formed within the heat shield 30 and around the swirl ring 34 and nozzle 35 to receive flowing gas from the bore 23 through the current transfer assembly 20, as indicated by the arrows in FIG. 2. The swirl ring 34 is provided with aperatures 40 to receive flowing gas therethrough and to the interior of the swirl ring 34 and nozzle 35 which provide a passageway 41 for the flow of gas through the nozzle member 28 and out an exit port 43 around the lower portion of the electrode 22 seated within the nozzle member 28. Excess gas also flows around the swirl member 34 and nozzle member 28 to exit through ports 44 on either side of the nozzle member 28, as indicated by the arrows in FIG. 2. With this arrangement, gas is circulated in contact with the lower portion of the electrode 22 for partial cooling thereof.

The electrode 22 may be of generally capsule-shape with a medial enlarged portion 22a providing upper and lower surfaces for being seated within the current transfer assembly 20 against upward movement in the torch head 12 and against the upper surface of the swirl member 34 of the nozzle assembly against downward movement within the torch head 12. This electrode 22 conventionally includes emissive inserts 49 in each end thereof and the electrode 22 may be reversed or replaced within the torch head 12 by simply removing the heat shield 30, the nozzle member 28 and the electrode 22 in a manner well understood by those with ordinary skill in the art.

When current is transferred from the current transfer assembly 20 to the electrode 22, an electrical arc is combined with the gas flowing out of the nozzle member 28 to form the plasma arc between the electrode 22 and the work being cut or welded in a manner well understood by those with ordinary skill in the art.

In order to increase the life of the electrode 22, while maintaining desired seating of the electrode 22 within the current transfer assembly 20 and transfer of current to the electrode 22 from the current transfer assembly 20, supplemental electrode cooling means are provided in accordance with this invention. This supplemental electrode cooling means defines passageways forming a part of or an extension of the gas flow means or passageway 23 in the torch head 12 for circulating the flowing gas through the current transfer assembly 20 in direct contact with a significant portion of the entire longitudinal extent of the surface of the upper portion of the electrode 22 which is received within the current transfer assembly 20 for additional cooling of the electrode 22.

In a first form of this supplemental electrode cooling means illustrated in FIGS. 2-6, the supplemental electrode cooling means preferably comprises a hollow member 50 insertable in the current transfer assembly 20 and threadably coupled thereto by threads 51 on the outside surface thereof cooperating with threads on the inside surface of the current transfer assembly 20. The hollow member 50 defines therewithin the above discussed passageways, indicated at 53, of the supplemental electrode cooling means. These passageways 53 in the hollow member 50 extend longitudinally of the electrode 22 along the entire longitudinal extent of the surface of the upper portion of the electrode 22 contained within the current transfer assembly 20, as may be seen in FIG. 2, for receiving the flowing gas therein for circulation over the surface of the electrode 22.

The hollow member 50 further defines therewithin shoulder portions 55 protruding transversely inwardly toward the electrode 22 between the passageways 53, as shown in FIGS. 5 and 6, for providing a seating means for the electrode 22 against upward movement of the electrode 22 in the hollow member 50 and the torch head 12. The hollow member 50 is constructed of electrically conductive material, which may be the same as the current transfer assembly 20, for transferring current from the current transfer assembly 20 to the electrode 22.

Although the passageways 53 and shoulder portions 55 could be formed internally within the current transfer assembly 20, it has been found by this invention that the use of a separate hollow member 50 threadably coupled with the current transfer assembly 20 is preferable from a manufacturing standpoint and provides an additional advantage of being easily replaced if the internal surfaces thereof are damaged by improper arcing within the head 12 of the plasma arc torch, which sometimes occurs during malfunctioning of the plasma arc torch 10. In that case, the separate hollow member 50 may be easily removed and replaced without replacing the entire current transfer assembly 20.

In a second form of electrode cooling means illustrated in FIGS. 7-10 wherein like reference numerals have been used for like components, the air flow passageways forming a part of the supplemental cooling means are formed, at least in part, in the electrode 22' and preferably in the enlarged portion 22a' thereof and are indicated by the reference numeral 53'. This second form of supplemental cooling means further includes a hollow member 50' insertable in the current transfer assembly 20 and threadably coupled thereto by threads 51' on the outside surface thereof cooperating with threads on the inside surface of the current transfer assembly 20. This hollow member 50' is also formed of electrically conductive material for transferring current from the transfer assembly 20 to the electrode 22'.

The hollow member 50' is spaced on the inside surface thereof from the top part of the upper portion of the electrode 22' within the current transfer assembly 20 to form a passageway 53" which forms a part of the air flow passageways of the supplemental cooling means. The passageways 53' formed in the electrode 22 are formed through a lower part 22a' of the upper portion of the electrode 22' for cooperating with the passageway 53" between the hollow member 50' and the electrode 22' to receive the flowing gas for circulation over the surface of the electrode 22'. The hollow member 50' also defines therewithin shoulder portions 55' protruding transversely inwardly toward the electrode 22' between the passageways 53' in the electrode 22' for providing electrode seating means against upward movement of the electrode 22' in the hollow member 50' and the torch head 12.

Thus, this invention has provided supplemental electrode cooling means, in the above described type of plasma arc torch, which forms part of the gas flow means through the torch head of the torch for circulating the flowing gas through the current transfer assembly in direct contact with a maximum portion of the entire longitudinal extent of the surface of the upper portion of the electrode received within the current transfer assembly for additional cooling of the electrode to increase the life thereof, while maintaining desired seating of the electrode in the current transfer assembly and transfer of current to the electrode from the current transfer assembly.

In the drawings and specification there has been set forth a preferred embodiment of this invention, and although specific terms are employed, they are used in a generic and descriptive sense only and not for purposes of limitation, the scope of the invention being defined in the following claims.

What is claimed is:

1. In a plasma arc torch having a torch head, a generally elongate solid electrode removably insertable in said torch head, current supply means adapted to be connected to a main power supply for supplying an electrical current to said torch head, gas flow means adapted to be connected to a source of gas for providing a flow of gas through said torch head to supply a plasma arc creasted by said torch and to contact the outside surface of a lower portion of said electrode for partial cooling of said electrode, current transfer assembly means in said torch head for receiving and seating therewithin at least an upper portion of said electrode against upward movement in said torch head and operatively connected to said current supply means for transferring current to sid electrode, nozzle assembly means for receiving and seating the lower portion of said electrode against downward movement in said torch head and operatively connected with said gas flow means for issuing a plasma arc outwardly from said torch head; the improvement therein of supplemental electrode cooling means comprising passageways which form a part of said gas flow means in said torch head and being defined by said electrode and said current transfer assembly means for circulating the flowing gas through said current transfer assembly means in direct contact with a significant portion of the entire longitudinal extent of the outside surface of said upper portion of said electrode received within said current transfer assembly means for additional cooling of the electrode to increase the life thereof, while maintaining desired seating of said electrode in said current transfer assembly means and transfer of current to said electrode from said current transfer assembly means; and a hollow member insertable in and forming a part of said current transfer assembly means and being formed of electrically conductive material for transferring current from said current transfer assembly means to said electrode and defining therewithin a portion of said passageways which are generally U-shaped in transverse cross-section and which extend longitudinally of the electrode along the entire longitudinal extent of the surface of said upper portion of said electrode within said current transfer assembly means for receiving the flowing gas therein for circulation over the surface of said electrode.

2. In a plasma arc torch, as set forth in claim 1, in which said hollow member further defines therewithin shoulder portions protruding transversely inwardly toward said electrode between said passageways for providing electrode seating means against upward movement of said electrode in said hollow member and said torch head.

3. In a plasma arc torch, as forth in claim 1 or 2, in which said hollow member includes means threadably coupling said electrode cooling member in said current transfer assembly means.

4. In a plasma arc torch having a torch head, a generally elongate solid electrode removably insertable in said torch head, current supply means adapted to be connected to a main power supply for supplying an electrical current to said torch head, gas flow means adapted to be connected to a source of gas for providing a flow of gas through said torch head to supply a plasma arc created by said torch and to contact the outside surface of a lower portion of said electrode for partial cooling of said electrode, current transfer assembly means in said torch head for receiving and seating therewithin at least an upper portion of said electrode against upward movement in said torch head and operatively connected to said current supply means for transferring current to said electrode, nozzle assembly means for receiving and seating the lower portion of said electrode against downward movement in said torch head and operatively connected with said gas flow means for issuing a plasma arc outwardly from said torch head; the improvement therein of supplemental electrode cooling means comprising passageways which form a part of said gas flow means in said torch head and being defined by said electrode and said current transfer assembly means for circulating the flowing gas through said current transfer assembly means in direct contact with a significant portion of the entire longitudinal extent of the outside surface of said upper portion of said electrode received within said current transfer assembly means for additional cooling of the electrode to increase the life thereof, while maintaining desired seating of said electrode in said current transfer assembly means and transfer of current to said electrode from said current transfer assembly means; and a hollow member insertable in and forming a part of said current transfer assembly means, formed of electrically conductive material for transferring current from said current transfer assembly means electrode, and spaced on the inside surface thereof from the top part of the upper portion of said electrode within said current transfer assembly means to provide a passageway forming a portion of the passageways of said supplemental electrode cooling means, and in which another portion of said passageways which are generally U-shaped in transverse cross-section are formed in said electrode through a lower part of the upper portion of said electrode for cooperating with said portion of passageways between said hollow member and said electrode to receive the flowing gas for circulation over the surface of said electrode.

5. In a plasma arc torch, as set forth in claim 4, in which said hollow member further defines therewithin shoulder portions protruding transversely inwardly toward said electrode between said portions of said passageways in said electrode for providing electrode seating means against upward movement of said electrode in said hollow member and said torch head.

6. In a plasma arc torch, as set forth in claim 4 or 5, in which said hollow member includes means threadably coupling said electrode seating member in said current transfer assembly means.

* * * * *